Patented June 26, 1945

2,379,294

UNITED STATES PATENT OFFICE 2,379,294

PROCESS OF INHIBITING GROWTH OF MOLDS

Chester M. Gooding, Staten Island, N. Y., assignor, by mesne assignments, to The Best Foods, Inc., New York, N. Y., a corporation of New Jersey No Drawing. Application February 26, 1940, Serial No. 320,895

16 Claims. (Cl. 99—224)

This invention relates to compounds useful in the retardation and prevention of growth of micro-organisms in and on food products and other products normally fostering the growth of such micro-organisms. Sodium benzoate is one of the most common preservatives used in food products, and is believed to prevent mold and bacteria growth by dissociation of the salt in a slightly acid medium to form benzoic acid which is an effective agent for preventing growth of micro-organisms.

Considerable objection to the use of sodium benzoate in food products is prevalent, however, due at least in part, to the fact that benzoic acid is a derivative of coal tar and contains the aromatic benzene ring. The objections may be based only upon inference from the stringent regulations which require label declaration when sodium benzoate is used as a preservative. Whether the objections to the use of sodium benzoate or benzoic acid in food products are well founded or not, such objections do exist.

One object of my invention is to provide mold inhibitors or preservatives that are highly effective in or on food and other products in retarding the growth of molds and other micro-organisms.

Another object of this invention is to provide methods of using certain aliphatic unsaturated fatty acids, together with the salts and esters thereof as mold inhibitors in and for food products as well as for other purposes.

It has long been known that an increase of acidity, or in other words, hydrogen ion concentration, is detrimental to mold growth. Frequently, however, it is not feasible to increase the acidity to the degree necessary to inhibit mold growth. For example, the decomposition of an acid-sensitive material may be accelerated thereby by reason of the greater acidity, or corrosion of a container may be produced, or in the case of a food product an undesirable acid taste may be imparted. The use of my invention permits the attainment of substantial inhibition of yeast and mold growth without appreciable increase of acidity. In other words, the mold-inhibiting characteristics of compounds used according to this invention are not based primarily upon an increase in acidity.

I have discovered that certain unsaturated aliphatic mono-carboxylic acids, and their salts and esters are effective in preventing the growth of various micro-organisms, particularly molds, in media where these micro-organisms would normally thrive. The acids preferably are entirely aliphatic in chemical constitution and possess at least one double bond in the alpha position in relation to the carboxyl group. Crotonic acid and its homologues are effective for this purpose, and the salts or esters of crotonic acid or of its corresponding homologues may be used effectively wherever a condition exists that allows such salts or esters to dissociate leaving the free acid. Other compounds that are particularly effective include sorbic acid, alpha hexenoic acid (also known as isohydrosorbic acid) and the salts and esters thereof. Various food products, such as fruit juices or products containing fruit juices, tomato products, butter and oleomargarine, fruits, cider and other food products in which sodium benzoate may be used are suitable media for the use of salts and esters of these aliphatic acids in accordance with my invention.

Crotonic acid, or its salts or esters may have an objectionable taste and odor in some food products, and where this factor is important, I prefer to employ one of the acids or a derivative thereof of higher molecular weight such as the sorbic or alpha hexenoic acids. Sorbic acid and its derivatives possess particular merit for use within the scope of this invention in that they are very effective for inhibiting growth of micro-organisms, and are also quite tasteless and odorless. Sorbic acid is closely related to crotonic acid in that it possesses a double bond adjacent to the carboxyl group, as shown in the following formula:

Alpha hexenoic similarly contains this nucleus and has the structural formula

In referring to crotonic acid, I intend to include both the cis and trans forms of this acid which are generally considered to have the following structural formulae:

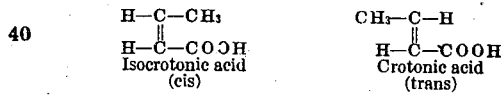

In addition to crotonic, sorbic and alpha hexenoic acids, and salts and esters thereof, other unsaturated mono-carboxylic aliphatic fatty acids containing the group

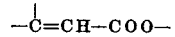

and having the following general formula may be employed for mold inhibiting purposes.

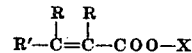

In the above formula, R represents hydrogen or an alkyl group, R' represents an aliphatic radical, and X represents hydrogen or an element or radical capable of forming a salt or ester of an acid. For example, beta-ethyl acrylic acid is a homologue of crotonic acid and, in general, has similar reactions thereto. Dimethylacrylic acid likewise may be suitable for purposes of this invention.

The lower molecular weight of the aliphatic acids according to this invention, such as crotonic acid as compared with benzoic acid allows a greater number of molecules of the acid to be actively present for a given weight of the preservative or mold inhibitor. Thus, it may be possible to utilize smaller percentages of crotonic acid, or its homologues, or their salts or esters, than 0.1%, which is the customary percentage of sodium benzoate employed. In addition, such compounds as crotonic acid are particularly effective for use in butter, margarine and allied products because of its very favorable high distribution coefficient between vegetable oil and water. In fact, this distribution coefficient of crotonic acid is about thirty times greater than that of benzoic acid. This is particularly important where the need for protection against microorganism growth is greatest in the aqueous phase of the food or other product with which the inhibitor is mixed. Sodium crotonate, for example, has been found to be very effective as a mold inhibitor when incorporated in an amount as small as .025% by weight in oleomargarine.

The acids, salts and esters of this invention may be mixed with various products during or after their preparation or manufacture. In some cases, such as the treatment of tobacco, leather products and other materials presenting a mold problem, a solution of the mold inhibitor in a suitable solvent may be sprayed over the product to be protected. These mold inhibitors may also be used in other ways as will be readily understood by those skilled in the art.

Mold inhibitors of my invention may also be used effectively in such products as bread, butter, cakes, and the like, or they may be used for other purposes than as an ingredient in food products. For example, crotonic acid, its salts or esters, may be used with tobacco as an ingredient added to the tobacco to prevent mold growth. Wrapping material for food products, such as vegetable parchment, may be dipped into a solution of one of the aliphatic acids of this invention, or of one of its salts or esters, to prevent any mold growth on the parchment paper, and to make the wrapping material more sanitary for use in wrapping food products.

The effectiveness of my new mold inhibitors has been demonstrated when used as an impregnation for wrappers for margarine as well as when used as an ingredient for such products. Margarine when wrapped in an untreated wrapper and stored at room temperature with 100% relative humidity showed visible mold growth after 21 to 24 days, whereas the margarine wrapped in wrappers impregnated with 10% by weight of sodium crotonate, sodium hexenoate and sodium sorbate, in each case was free from visible mold growth at the end of 77 days of storage under the same conditions.

For most purposes 0.1% of my new mold inhibitors is a sufficient quantity to add to or mix with the product to be protected. More than 1% by weight of the mold inhibitor usually serves no useful purpose. When my agents are used in the manner of impregnated wrappers the concentration of the agent based upon the weight of wrapper need not be greater than 10%. The use of the agent in this way is often desirable in that considerable economy results.

Any of the various salts or esters of the aliphatic acids of this invention may be used satisfactorily under conditions producing dissociation of the salt or ester to the free acid. When one of these inhibitors is incorporated in a food product, however, care should be exercised to select an edible salt or ester, such as the sodium or calcium salts or the ethyl esters, etc. The crotonic, sorbic and alpha hexenoic acids themselves are not toxic and do not have unpleasant odors. In addition, they are completely aliphatic and therefore are free from objections associated with coal tar derivatives.

The term "inhibitor" as used herein is not used in the narrow sense of preventing the growth of microorganisms but is used generically to include substances that may either retard or prevent such growth.

The term "aliphatic," as applied to compounds and radicals or groups, is used in its ordinary sense as synonymous with acyclic or open chain carbon compounds and groups. The term "alkyl" radical or group is used to denote monovalent radicals derived from an aliphatic hydrocarbon by removal of one hydrogen atom.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of inhibiting growth of molds in or on products normally fostering such growth comprising bringing into close association with such product an aliphatic mono-carboxylic compound having the formula

in which R' is an aliphatic radical, R is a substance selected from the group consisting of hydrogen and alkyl radicals, and X is a substance selected from the group consisting of hydrogen, and elements and radicals that form salts and esters of an acid.

2. A process as defined in claim 1 in which the compound is incorporated into the product.

3. A process as defined in claim 1 in which the compound is applied to the exterior of the product.

4. A process as defined in claim 1 in which the compound is applied to a wrapper for the product.

5. A process as defined in claim 1 in which the compound is selected from the group consisting of crotonic acid, and salts and esters thereof.

6. A process as defined in claim 1 in which the compound is selected from the group consisting of sorbic acid, and salts and esters thereof.

7. A process as defined in claim 1 in which the compound is selected from the group consisting of alpha hexenoic acid, and salts and esters thereof.

8. A method of inhibiting mold growth on a food product comprising incorporating in said product an effective amount up to about 1% by weight of an edible compound selected from the group consisting of crotonic acid, and salts and esters thereof.

9. A method of inhibiting mold growth on a food product comprising incorporating in said product an effective amount up to about 1% by weight of an edible compound selected from the group consisting of sorbic acid, and salts and esters thereof.

10. A method of inhibiting mold growth on a food product comprising incorporating in said product an effective amount up to about 1% by weight of an edible compound selected from the group consisting of alpha hexenoic acid, and salts and esters thereof.

11. A method of preserving a food product against mold growth thereon comprising wrapping said product in a sheet of material coated with an effective amount up to about 10% by weight of the wrapper of a compound selected from the group consisting of crotonic acid, and salts and esters thereof.

12. A method of preserving a food product against mold growth thereon comprising wrapping said product in a sheet of material coated with an effective amount up to about 10% by weight of the wrapper of a compound selected from the group consisting of sorbic acid, and salts and esters thereof.

13. A method of preserving a food product against mold growth thereon comprising wrapping said product in a sheet of material coated with an effective amount up to about 10% by weight of the wrapper of a compound selected from the group consisting of alpha hexenoic acid, and salts and esters thereof.

14. A process of inhibiting growth of molds in or on products normally fostering such growth comprising bringing into contact with such product a compound selected from the group consisting of crotonic, sorbic and alpha hexenoic acids, their salts and esters.

15. A process of inhibiting mold growth on a food product comprising incorporating in said product an effective amount up to about 1% by weight of a compound selected from the group consisting of crotonic, sorbic and alpha hexenoic acids, their edible salts and esters.

16. A process of preserving a food product against mold growth thereon comprising wrapping said product in a sheet of material coated with an effective amount up to about 10% by weight of the wrapper of a compound selected from the group consisting of crotonic, sorbic and alpha hexenoic acids, their edible salts and esters.

CHESTER M. GOODING.